No. 719,867. PATENTED FEB. 3, 1903.
A. C. RADER.
MOLD FOR MAKING PARTITION BLOCKS.
APPLICATION FILED AUG. 2, 1902.

NO MODEL. 2 SHEETS—SHEET 1.

WITNESSES:
John A. Rennie
C. Bradway.

INVENTOR
August C. Rader
BY
Foster & Niles
ATTORNEYS.

No. 719,867. PATENTED FEB. 3, 1903.
A. C. RADER.
MOLD FOR MAKING PARTITION BLOCKS.
APPLICATION FILED AUG. 2, 1902.
NO MODEL. 2 SHEETS—SHEET 2.

WITNESSES:
John A. Rennie
E. Bradway

INVENTOR
August C. Rader
BY
Beever Niles
ATTORNEYS.

UNITED STATES PATENT OFFICE.

AUGUST C. RADER, OF MONTCLAIR, NEW JERSEY.

MOLD FOR MAKING PARTITION-BLOCKS.

SPECIFICATION forming part of Letters Patent No. 719,867, dated February 3, 1903.

Application filed August 2, 1902. Serial No. 118,092. (No model.)

*To all whom it may concern:*

Be it known that I, AUGUST C. RADER, a citizen of the United States, residing in Montclair, in the county of Essex and State of New Jersey, have invented certain new and useful Improvements in Molds for Making Partition-Blocks, of which the following is a specification.

This invention relates to an improved mold for making partition-blocks in which plaster-of-paris forms the main ingredient and which are used for partition-walls of buildings, walls of dumb-waiters, and the like, said molds being so arranged that a number of blocks can be cast in the mold at the same time instead of making the blocks in separate molds, as heretofore; and the invention consists of a mold for making partition-blocks which comprises a base-board, upright side walls provided with vertical guide-grooves and core-openings intermediately between said grooves, transverse partition-plates received in said grooves, means for locking the side walls together, transverse core-pieces fitted into the core-openings of the side walls, and means connected with the outer ends of the core-pieces for removing the same after the partition-blocks cast in the mold have set; and the invention consists, further, of certain details of construction and combination of parts, which will be more fully described hereinafter and finally pointed out in the claims.

Figure 1:
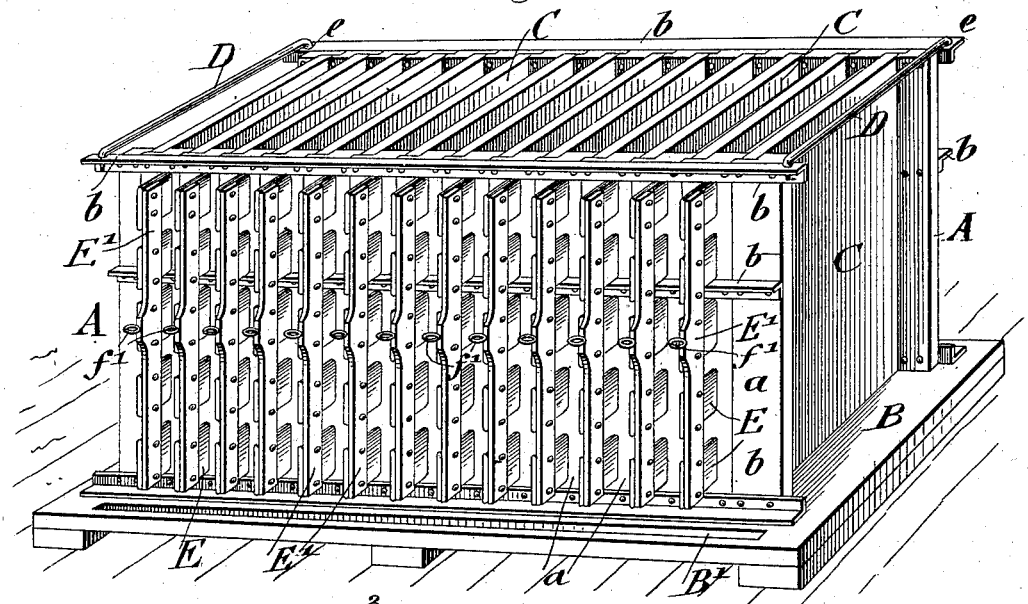
Figure 2:
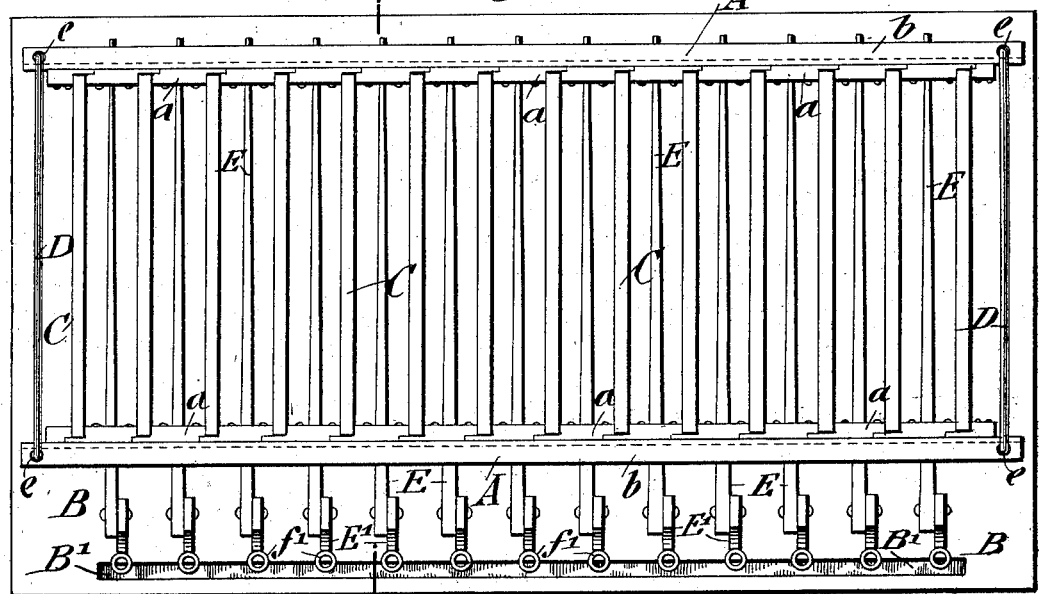
Figure 5:
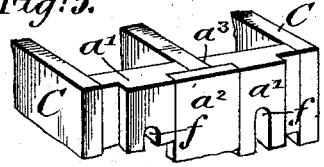
Figure 3:
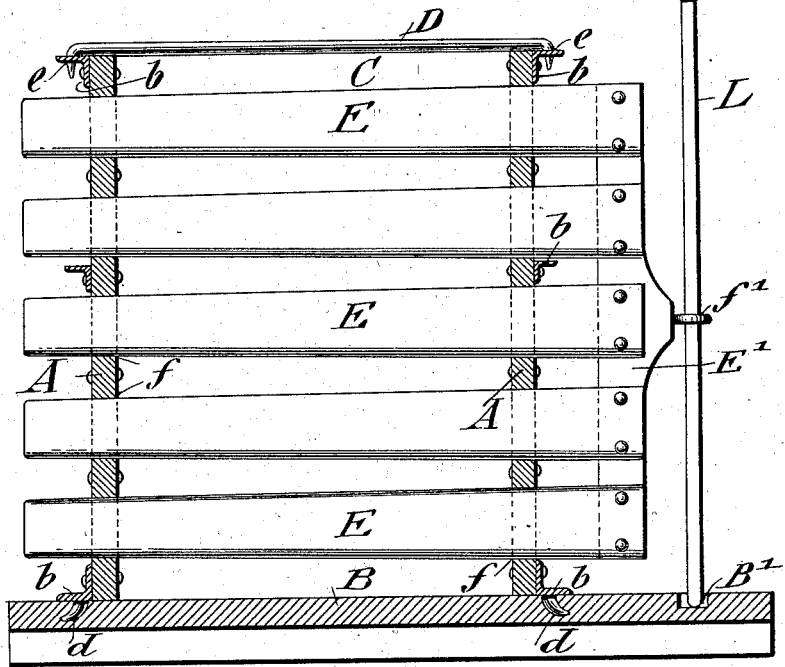
Figure 4:
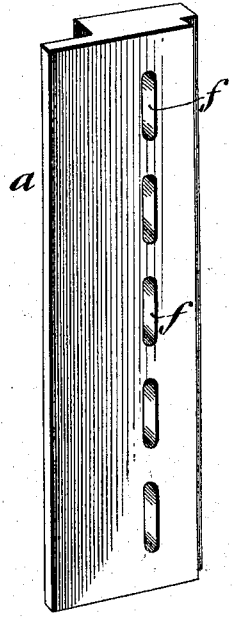

In the accompanying drawings, Figure 1 is a perspective view of my improved mold for making partition-blocks. Fig. 2 is a plan view of Fig. 1. Fig. 3 is a vertical transverse section on line 3 3, Fig. 2, drawn on a larger scale. Fig. 4 is a detail perspective view of one of the sections of the side wall shown in detached position, and Fig. 5 is a detail perspective view of modified forms of sections of the side wall.

Similar letters of reference indicate corresponding parts.

In the drawings, A represents the upright side walls of my improved mold for making partition-blocks. The side walls are formed of a number of parallel sections $a$, preferably made of cast-iron and riveted to longitudinal angle-irons $b$ at the upper and lower ends and at one or more intermediate points of the side walls, as shown clearly in Fig. 1. In place of making the side walls A of the sections $a$ they may be formed of a number of two different sections—namely, main sections $a'$, rabbeted at the two front edges, and secondary sections $a^2$, fitting into the spaces between the rabbeted edges of adjacent main sections in such a manner that upright grooves $a^3$ are formed for partition-plates, as shown in Fig. 5. Each section $a$ is rabbeted at two diagonal edges, so as to have tongues of unequal length, so that when the sections are assembled they form vertical grooves for the reception of the vertical edges of partitions C. The vertical grooves are at a distance from each other equal to the thickness of the blocks to be formed in the mold. These grooves serve for receiving the partition-plates C, which are dropped into them, said partition-plates being made of any suitable material, such as wooden boards covered with sheet metal, linoleum, slate, glass, rubber, layers of wire-netting covered with rubber or asphalt or the like, or any other suitable material that permits the separation of the molded partition-blocks from the partition-plates when removing the blocks from the mold. The side walls A can also be made of one integral piece of cast metal, but it is preferable to build the same from sections. The lower angle-irons $b$ are provided with lugs $d$, that engage sockets in the base-board B, as shown in Fig. 3. The side walls are connected at their upper ends by transverse clamps D, that are provided with bent tapering ends that engage in holes $e$ at the projecting ends of the upper angle-irons, as shown in Fig. 1, and, if desired, at intermediate points of the mold, said transverse clamps holding the side walls in position and taking up the strain of the mass cast into the mold.

The sections $a$, forming the side walls, are provided intermediately between the guide-grooves with a number of elongated openings $f$, arranged in vertical rows for the core-plugs E. The core-plugs are provided with a slight taper both in thickness as well as in height and the core-openings $f$ in the side walls being made to correspond to the taper of the core-plugs, so that the same fit accurately into the openings. The core-plugs for each row of core-openings $f$ are connected at one end by means of the head E', which is riveted to the ends of the core-plugs E, as shown in Fig. 3, and which is provided with a central eye $f'$, through which is placed a lever L, the lower end of which fulcrums in the groove B' of the base-board, while the upper end is provided with a handle, and by means of this lever the withdrawal of the core-plugs is facilitated when the partition-blocks have set sufficiently in the mold. The core-plugs may be operated or withdrawn separately or they may be connected in a suitable manner so as to be operated together by means of a hydraulic cylinder or other suitable power, so that all the core-plugs can be withdrawn together. The core-plugs are preferably made of wood in the well-known manner and are kept greased, so as to permit the withdrawing of the same from the partition-blocks.

My improved mold for making partition-blocks is operated as follows: The side walls are placed in position of the base-board and locked together by the transverse clamps. The transverse partition-plates are then inserted into the guide-grooves at the inside of the side walls and the core-plugs placed in position in the core-openings of the side walls. The mold is then ready for casting the mass, which is formed of an easily-flowing mixture of plaster-of-paris and ashes that has been prepared ready for casting. After all the spaces between the partition-plates and core-plugs are filled the mass is carefully tamped by a tamping stick or rod, so as to fill uniformly all parts of the mold, after which it is evened up at the top and then allowed to set. After the mass has set sufficiently, so as to permit the removal of the partition-blocks, the core-plugs are withdrawn by withdrawing one set after the other by means of the lever inserted into the eye of the same or all of them together by means of a hydraulic motor applied to a connecting-bar of the heads of the core-plugs. (Not shown.) After the core-plugs are withdrawn the partition-plates are released by disconnecting the clamps, moving the side walls in lateral direction, and separating them from the base-board, so that the partition-blocks can be removed from the partition-plates and then stored up for use as required.

My improved mold for making partition-blocks has the advantage that a considerable number of blocks can be cast at the same time, whereby a considerable saving in time and labor is obtained, and, secondly, that a larger quantity of uniformly-shaped partition-blocks can be made within a given time.

Having thus described my invention, I claim as new and desire to secure by Letters Patent—

1. A mold for making partition-blocks, consisting of a base-board, upright side walls supported on said base-board and consisting of sections forming vertical guide-grooves and angle-irons securing the same together, said sections being provided with core-openings intermediately between said guide-grooves, transverse clamps for fastening the side walls together, transverse partitions inserted in the guide-grooves of the side walls, transverse core-plugs passing through the core-openings of the sections, heads connecting one end of the core-plugs of each section, and means applied to said heads for withdrawing the core-plugs, substantially as set forth.

2. A mold for making partition-blocks, consisting of a base-board, side walls provided with bottom lugs engaging sockets of said base-board, said side walls being formed of upright sections and longitudinal angle-irons attached thereto, said sections having centrally-disposed core-openings and forming guide-grooves, clamps for connecting the side walls together at their upper ends, partition-plates inserted into the guide-grooves of the side walls, core-plugs inserted into the core-openings of the sections, said core-plugs being made tapering both as to width and height, and means for simultaneously withdrawing said core-plugs from the partition-blocks after the mass has set, substantially as set forth.

In testimony that I claim the foregoing as my invention I have signed my name in presence of two subscribing witnesses.

AUGUST C. RADER.

Witnesses:
PAUL GOEPEL,
C. BRADWAY.